Oct. 14, 1958 B. D. LOUGHLIN 2,856,454

VIDEO-FREQUENCY SIGNAL-TRANSLATING APPARATUS

Filed Feb. 11, 1955 3 Sheets-Sheet 1

VIDEO-FREQUENCY SIGNAL-TRANSLATING APPARATUS

Filed Feb. 11, 1955

3 Sheets-Sheet 3

2,856,454

VIDEO-FREQUENCY SIGNAL-TRANSLATING APPARATUS

Bernard D. Loughlin, Lynbrook, N. Y., assignor to Hazeltine Research, Inc., Chicago, Ill., a corporation of Illinois Application February 11, 1955, Serial No. 487,567

17 Claims. (Cl. 178—5.4)

*General*

The present invention is directed to video-frequency signal-translating apparatus for a compatible image-reproducing system particularly for use in color-television receivers and, more specifically, to such apparatus for use in a compatible color-television receiver of the NTSC type utilizing a single-gun type of picture tube in which the electron beam is sequentially directed onto different color phosphors.

In a form of color-television system more completely discussed in many articles in the January, 1954 issue of the Proceedings of the I. R. E., information representative of a scene in color being televised is utilized to develop at the transmitter two substantially simultaneous signals, one of which is primarily representative of the brightness or luminance and the other of which is representative of the chrominance of the televised image. The latter signal is a subcarrier wave signal having a mean frequency within the video-frequency pass band and having successive cycles thereof modulated in amplitude at different phases by signal components representative of specific hues of the televised image. The composite video-frequency signal comprising the luminance signal and the modulated subcarrier wave or chrominance signal is then employed in a conventional manner to modulate a radio-frequency wave signal. The signals just described are utilized in an NTSC type of system and, therefore, will be referred to hereinafter as NTSC type signals.

A receiver in an NTSC type of system intercepts the radiated signal and derives the composite video-frequency signal, including the luminance and chrominance signals, therefrom. One type of such receiver includes a pair of principal channels for individually translating the luminance and chrominance information for application to an image-reproducing device in such receiver. The channel for translating the luminance signal is substantially the same as the video-frequency amplifier stages of a conventional monochrome receiver. In one type of receiver, the channel for translating the chrominance signal includes means for deriving signals representative of the primary colors red, green, and blue and for combining such derived signals with the luminance signal to provide signals which may be utilized in an image-reproducing device to effect color reproduction of the televised image.

More recently, a one-gun type of image-reproducing device, referred to as a focus-mask type of device, and circuits for modifying the NTSC type of composite video-frequency signal for use in such device have been described in an article entitled "Processing of the NTSC Color Signal for One-Gun Sequential Color Displays" in the January, 1954 issue of the Proceedings of the I. R. E. at pages 299–308, inclusive. As described in such article, the focus-mask type of picture tube includes repeating groups of parallel strips of different phosphors individually for emitting green, red, and blue colors, each group having the sequence green, red, green, blue. A grid structure comprising a plurality of conductors which are parallel to each other and to the phosphor strips on the screen has one of such conductors positioned behind each of the phosphor strips for emitting red and blue colors and none behind the strip for emitting green. Such grid is energized by a signal synchronized with the modulated subcarrier wave signal so as to direct the cathode-ray beam, intensity-modulated by the brightness and subcarrier wave signals, onto the proper phosphor strips as such beam translates information of the color emitted by the excited strip. As described in the I. R. E. article, an NTSC type of signal may not be applied directly to a picture tube of the type just described if fidelity of color reproduction is to be obtained. Prior to application to such picture tube, the luminance signal should be modified to include a luminance-correction component and the modulated subcarrier wave signal should be converted into one wave signal of the same mean frequency as the detected chrominance signal and including only color information representative of red and blue and into a second harmonic wave signal including information representative of green. The modified luminance signal and fundamental and second harmonic subcarrier wave signals are combined for application to such picture tube to effect reproduction of the color image.

Such modified NTSC type of composite video-frequency signal is adequate to reproduce a color image in such picture tube when color information is being transmitted and received. However, when only monochrome information is being received or it is desired to reproduce a monochrome image from color signals, the black-and-white image reproduced in this type of picture tube tends to have spurious color patterns having red and blue elements. These spurious patterns apparently arise from a heterodyning of the high-frequency monochrome signals, particularly those signals in the range of 3–4 megacycles, with the color-switching operation occurring at approximately 3.6 megacycles. Such heterodyning results in low-frequency beat signals of approximately 0–.06 megacycle which appear with high visibility as red and blue patterns. These spurious effects have been reduced by including in the luminance channel a filter network having an upper cutoff frequency of approximately 3 megacycles so that effectively no luminance information above 3 megacycles is utilized. However, the use of such filter network is detrimental in preventing the reproduction of high-definition monochrome images. Though it is desirable to eliminate or minimize the spurious color patterns reproduced in a monochrome image, it is equally important to utilize all of the luminance information available in order to obtain the highest quality of reproduction and the maximum degree of compatibility. The improved video-frequency signal-translating apparatus for a compatible image-reproducing system in accordance with the present invention is designed to effect such result.

It is, therefore, an object of the present invention to provide a new and improved video-frequency signal-translating apparatus for a compatible image-reproducing system by means of which the deficiencies of prior such systems when utilizing an NTSC signal are diminished.

It is another object of the present invention to provide a new and improved video-frequency signal-translating apparatus for a color-television receiver including a single-gun type of picture tube which effects increased definition in the reproduced monochrome images.

It is a still further object of the present invention to provide a new and improved video-frequency signal-translating apparatus for a compatible image-reproducing system for a color-television receiver including a single-gun type of picture tube, and in which the NTSC type of signal is employed, by means of which reproduced monochrome images have higher definition than in prior such systems with a minimum of spurious color patterns.

In accordance with the present invention, in a compatible image-reproducing system including means for reproducing a monochrome or color image by periodic sampling of different primary color elements and susceptible to spurious color distortions during the reproduction of a monochrome image due to sampling of high-frequency video components upon their application to elements of a given primary color, video-frequency signal-translating apparatus comprises a circuit for supplying at least the high-frequency components of the monochrome or color signals, signal-generating means for developing a reference signal harmonically related in frequency to the sampling rate of elements of the given color and having different phases with respect to the sampling times of the given color when color and monochrome images are being reproduced. Finally, the signal-translating apparatus includes signal-translating means coupled to the signal-generating means and having a varying signal-translation factor controlled by the reference signal and coupled to the supply circuit for effecting translation of the supplied high-frequency components primarily at the sampling times of the given color when a color image is being reproduced and primarily at other times when a monochrome image is being reproduced.

For a better understanding of the present invention, together with other and further objects thereof, reference is had to the following description taken in connection with the accompanying drawings, and its scope will be pointed out in the appended claims.

Referring to the drawings:

Fig. 1 is a schematic diagram of a color-television receiver including a video-frequency signal-translating apparatus for a compatible image-reproducing system in accordance with the present invention;

Fig. 1*a* is a vector diagram useful in explaining the operation of the receiver of Fig. 1;

Fig. 1*b* comprises a set of curves useful in explaining the operation of the receiver of Fig. 1;

Figure 1:
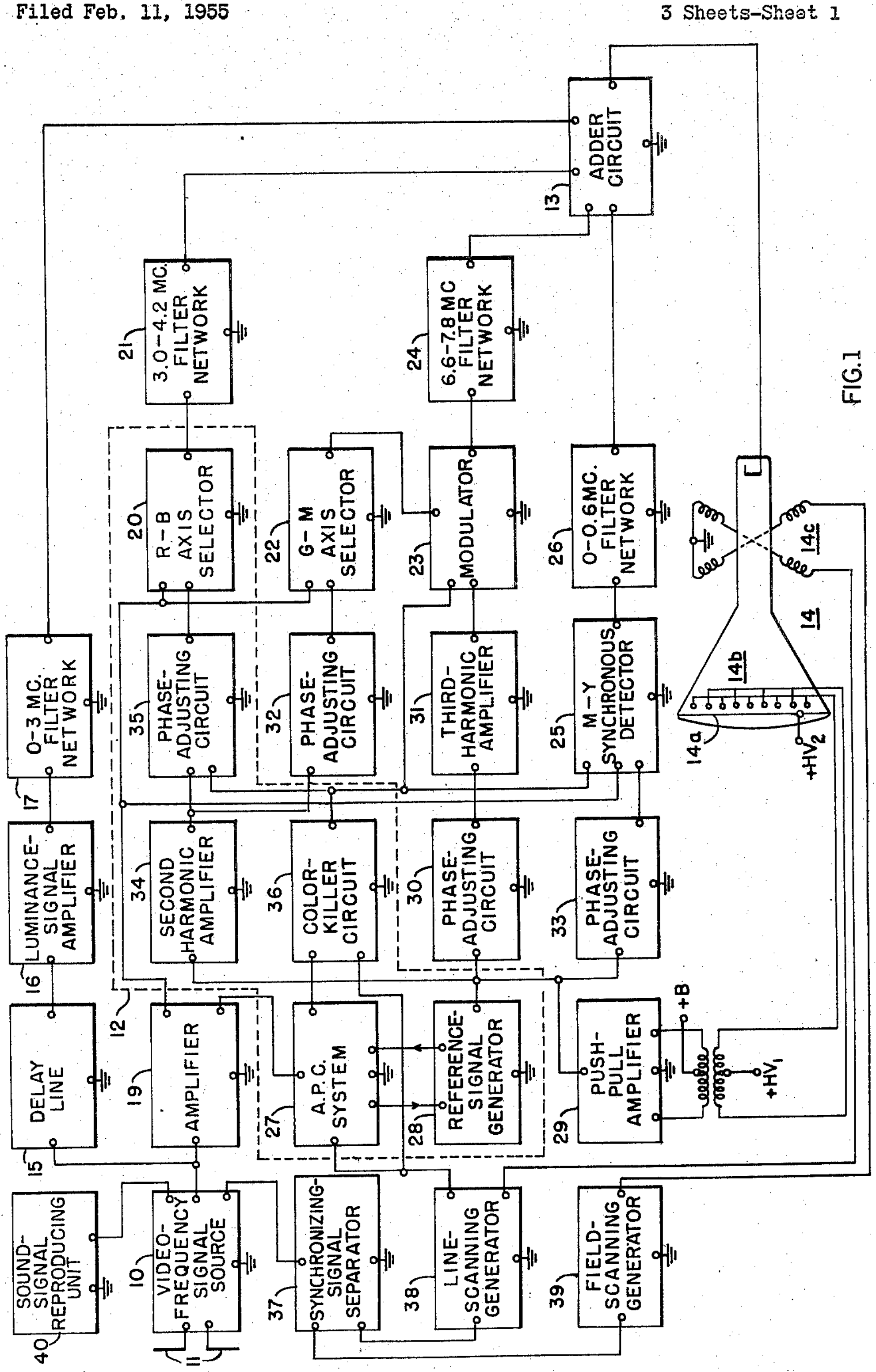

*General description of receiver of Fig. 1*

Referring now to Fig. 1 of the drawings, there is represented a color-television receiver of the superheterodyne type suitable for utilizing an NTSC type of color-television signal and, more specifically, a receiver of the type described in the aforementioned I. R. E. article entitled "Processing of the NTSC Color Signal for One-Gun Sequential Color Displays." The receiver includes a video-frequency signal source 10. The source 10 can be conventional equipment for supplying an NTSC type of composite video-frequency signal, for example, it can include a radio-frequency amplifier having an input circuit coupled to an antenna 11, an oscillator-modulator, an intermediate-frequency amplifier, and a detection system for deriving the video-frequency signal. Coupled in cascade with an output circuit of the unit 10, in the order named, are a delay line 15, a luminance-signal amplifier 16, a 0–3 megacycle filter network 17, an adder circuit 13, and a single-gun image-reproducing apparatus 14. The delay line 15 is conventional and serves to equalize the time of translation of the luminance signal through the units 15, 16, and 17 with that for translation of the chrominance signal through other channels to be considered hereinafter. The amplifier 16 is a conventional wide band amplifier. The image-reproducing apparatus 14 is a single-gun, focus-mask type of apparatus fully considered in the last-mentioned I. R. E. article. The apparatus 14 includes a picture tube having an image screen **14*a*, a color-switching grid 14*b*, and horizontal and vertical deflection windings 14*c*. Phosphors for emitting green, red, and blue lights are interleaved on the screen 14*a* in the order of green, red, green, and blue with a wire of one group of grid wires of the grid 14*b*** positioned behind each of the red phosphors and a wire of the other group behind each blue phosphor.

There is also coupled between the aforementioned output circuit of the source 10 and an input circuit of the adder circuit 13, in cascade in the order named, an amplifier 19 having a pass band of approximately 3.0–4.2 megacycles, a video-frequency signal-translating apparatus 12 in accordance with the present invention and to be considered more fully hereinafter, and a 3.0–4.2 megacycle filter network 21. Though the apparatus 12 will be described fully hereinafter, some of the components of it cooperate with apparatus not in the apparatus 12 and a brief description of these components is now given for clarity. For effecting control of the signal-detecting and color-switching signals to be considered more fully hereinafter, the apparatus 12 includes, in cascade in the order named and coupled to an output circuit of the amplifier 19, an automatic-phase-control system 27 and a reference-signal generator 28. The generator 28 can be a conventional sine-wave generator and the system 27 maintains the operation of the generator 28 in synchronism and at a specific phase with respect to a reference signal developed at the transmitter. A more detailed description of the system 27 will be presented hereinafter when considering the apparatus 12 in detail. The output circuit of the generator 28 is coupled through a push-pull amplifier 29 to the color-switching control grid **14*b* in the image-reproducing apparatus 14**.

There are also coupled, in cascade in the order named, between the aforementioned output circuit of the amplifier 19 and an input circuit of the adder circuit 13, a G–M axis selector 22, a modulator 23, and a 6.6–7.8 megacycle filter network 24. The output circuit of the generator 28 is coupled through a second harmonic amplifier 34, which is a component of the apparatus 12, and a phase-adjusting circuit 32 to another input circuit of the axis selector 22. A control circuit in the modulator 23 for controlling the conductivity thereof is coupled to an output circuit of a color-killer circuit 36 in the apparatus 12 and to be considered more fully hereinafter. The output circuit of the generator 28 is also coupled through a phase-adjusting circuit 30 and a third harmonic amplifier 31 to an input circuit of the modulator 23. More complete consideration of the type of circuit employed for axis selection, such as represented by the G–M axis selector 22, will be given when considering the apparatus 12 in detail. In general, such axis selector is an amplifier, the gain of which is periodically controlled in phase with a modulation component of the subcarrier wave signal so as to translate such component with high gain while not translating other components in quadrature therewith or translating such other components with relatively low gain. The modulator 23, the filter network 24, and the third harmonic amplifier 31 can be of conventional construction, units of these types being so well known as to require no further description. The phase-adjusting circuits 30 and 32 are networks for delaying the phase of the signal generated in the generator 28 by appropriate amounts so that the signals applied to the axis selector 22 and the modulator 23, after such phase adjustments, are in phase with the desired modulation axis of the subcarrier wave signal. In the circuit under consideration, such axis is the G–M axis as more fully considered in the I. R. E. article last mentioned above.

There are also coupled in cascade in the order named between an output circuit of the amplifier 19 and an input circuit of the adder circuit 13, an M–Y synchronous detector 25 and a 0–0.6 megacycle filter network 26. An input circuit of the synchronous detector 25 is coupled to the color-killer circuit 36 to control the state of operation of the detector 25 in a manner to be considered more fully hereinafter. An additional input circuit of the synchronous detector 25 is coupled through a phase-adjusting circuit 33 to the output circuit of the generator 28 for the purpose of applying, from the unit 28 to the detector 25, a locally generated signal which is in phase with the M–Y modulation component of the subcarrier wave signal as more fully described in the aforesaid I. R. E. article.

A synchronizing-signal separator 37 is also coupled to an output circuit of the video-frequency signal source 10 and has output circuits coupled through a line-scanning generator 38 and a field-scanning generator 39 to the horizontal and vertical deflection windings 14c, respectively, in the image-reproducing apparatus 14. An output circuit of the generator 38, for example, a tap on the horizontal deflection transformer therein is coupled to input circuits of the A. P. C. system 27 and the color-killer circuit 36, both in the apparatus 12 and to be considered more fully hereinafter, for applying horizontal flyback pulses as gating signals to such units.

An output circuit of the video-frequency signal source 10 is also applied to a sound-signal reproducing unit 40 which may comprise a conventional intermediate-frequency amplifier, an audio-frequency detector, an audio-frequency amplifier, and a sound reproducer.

Except for the details of combination of circuits in the video-frequency signal-translating apparatus 12, to be considered more fully hereinafter, all of the circuit components thus far described are conventional and well known, being fully considered in the January, 1954 I. R. E. article entitled "Processing of the NTSC Color Signal for One-Gun Sequential Color Displays." Therefore, no detailed description of such circuit components is provided herein.

*General operation of receiver of Fig. 1*

Considering briefly now the operation of the receiver of Fig. 1 as a whole and assuming the apparatus 12 to be of a conventional type for developing a subcarrier wave signal modulated only by information representative of blue and red, that is, by an R–B component and is such as described in the aforesaid I. R. E. article, a desired composite color-television signal of the NTSC type is intercepted by the antenna system 11, selected, amplified, converted to an intermediate-frequency signal, further amplified, and the composite video-frequency signal component thereof detected in the unit 10. The composite video-frequency signal comprises conventional line- and field-synchronizing components, a color burst synchronizing component, and the aforementioned luminance and chrominance signals. The luminance signal is translated through the luminance-signal channel including units 15, 16, and 17 and through the adder circuit 13 and applied to the cathode of the image-reproducing apparatus 14. The chrominance signal is translated through the amplifier 19, converted in the apparatus 12 to a chrominance signal having only information representative of red and blue, that is, to a subcarrier wave signal modulated by an R–B component, and the converted signal, after translation through the filter network 21 and the adder circuit 13, is applied to the cathode of the picture tube in the image-reproducing apparatus 14. In the axis selector 22, the chrominance signal is converted to one including information representative of green, that is, to a subcarrier wave signal modulated by a G–M component. In the modulator 23 such converted chrominance signal, having the same frequency as the initially applied chrominance signal, is heterodyned with a signal having the third harmonic frequency of the initially applied signal for developing a second harmonic chrominance signal including information representative of green. The latter signal is translated through the filter network 24 and the adder circuit 13 and applied to the cathode of the image-reproducing apparatus 14. The phasing of the third harmonic signal is such that the developed signal, after translation through the network 24 and the adder circuit 13, will apply the G–M information to the cathode of the picture tube in coincidence with the impinging of the electron beam on the green phosphors.

The chrominance signal in the output circuit of the amplifier 19 is also utilized in the synchronous detector 25 to derive a luminance-correction signal M–Y, the low-frequency components of which are translated through the filter network 26 and the adder circuit 13 for utilization in the image-reproducing apparatus 14 to correct for luminance errors inherently caused by the chrominance signals in a single-gun tube such as utilized in the apparatus 14.

To effect proper operation of the axis selectors, such as the axis selector 22, and proper operation of the modulator 23 and the synchronous detector 25, that is, to control these units to operate in correct relationship with respect to the appropriate phases of the modulated subcarrier wave signal applied thereto, a sine-wave reference signal of the same frequency as the subcarrier wave signal is developed in the generator 28 and controlled in phase with respect to the subcarrier wave signal by means of the A. P. C. system 27. The system 27 is responsive to the reference signal and the color burst signal translated through the amplifier 19 and maintains the reference signal at a specific phase with respect to the color burst synchronizing signal and thus maintains the reference signal at specific phases with respect to the different modulation phases of the applied subcarrier wave signal. These phase relationships are represented by the vector diagram of Fig. 1*a*. The R–B modulation axis of the subcarrier wave signal is 29° clockwise, the G–M axis 40° counterclockwise, and the M–Y signal 161° clockwise or 199° counterclockwise with respect to the phase of the color burst signal.

The reference signal developed in the generator 28 is doubled to a second harmonic signal in the amplifier 34 and the phase of such second harmonic signal is adjusted by means of circuit 35 so as to render the axis selector 20 conductive in phase with the R–B axis of the modulated subcarrier wave signal. The signal developed in the amplifier 34 is also adjusted in phase by means of the circuit 32 to cause the axis selector 22 to be conductive in phase with the G–M phase of the applied subcarrier wave signal. The signal developed in the generator 28 is controlled in phase by the circuit 30 so as to have a specific phase with respect to the time of impingment of the beam in the picture tube on the green phosphors and such phase-controlled signal is then multiplied to a third harmonic signal in the amplifier 31, the latter signal being employed in the modulator 23 to develop a second harmonic subcarrier wave signal modulated by G–M information at a phase such that, when such developed signal is applied to the picture tube, the G–M information is applied to the green phosphors. The signal developed in the generator 28 is also controlled in phase by the circuit 33 to be in phase with the M–Y axis of the applied subcarrier wave signal, thereby to derive the N–Y component in the detector 25.

The signal developed in the generator 28 is also applied through the push-pull amplifier 29 to the color-switching grid 14b in the image-reproducing apparatus 14, the applied or color-switching signal having a specific phase relation to the fundamental subcarrier wave signal translated through the network 21, and which includes R–B information at a specific phase, and to the second harmonic subcarrier wave signal developed in the modulator 23, and which includes G–M color information at a specific phase. The phase relations of the color-switching, fundamental, and second harmonic wave signals are as represented by the curves of Fig. 1*b*. The vertical lines G, R, R, G, B, and B represent the times of impingment of the cathode-ray beam on the green (G), red (R), and blue (B) phosphors. Curve F represents the phase of the fundamental subcarrier wave signal modulated by R–B information and it is apparent that the fundamental signal is in phase with the color-switching operation. Curve S represents the second harmonic subcarrier wave signal modulated by G–M information and curve C represents the composite of the fundamental (F) and second harmonic (S) subcarrier wave signals. Line M reprepresents the corrected luminance signal level, that is, the level for the signal M.

In the synchronizing-signal separator 37, the line- and field-synchronizing signals are separated from the composite video-frequency signal and from each other and are utilized, respectively, in the generators 38 and 39 to develop horizontal deflection and field deflection signals employed in the deflection windings 14*c* to effect deflection of the cathode-ray beam to scan a raster on the image screen 14*a*. The scanning of such raster, the intensity modulation of the cathode-ray beam by means of the corrected luminance, fundamental subcarrier, and second harmonic subcarrier signals applied thereto, and the differential vertical deflection of the beam by means of the color-switching signal applied to the grid 14*b* combine to cause the intensity-modulated beam to impinge upon the phosphors for developing the different colors in correspondence with intensity modulation on such beam for these colors, thereby to reproduce a color image.

In addition to the picture signal, a sound signal is also intercepted and an intermediate-frequency sound signal is derived from source 10. Such intermediate-frequency sound signal is then further amplified in the unit 40 and the audio-frequency components thereof are detected, additionally amplified, and utilized to reproduce sound in the unit 40.

When a monochrome television signal is intercepted by the antenna 11, all of the units in the receiver of Fig. 1 function in the manner just described except for some of the units used for developing color images. Since no color-synchronizing signal is received with a monochrome signal, the A. P. C. system 27 is unable to function and the color-switching signal developed by the generator 28, though it has a frequency of approximately 3.6 megacycles, is no longer locked in specific phase relation with line frequency. The failure of the A. P. C. system 27 to function causes the color-killer circuit 36, in a manner to be explained more fully hereinafter, to develop a negative bias potential which causes the modulator 23 and the detector 25 to become nonconductive and which changes the mode of operation of the selector 20 in a manner to be considered in detail. As a result, only monochrome information is applied to the picture tube to cause the reproduction of a monochrome image.

Figure 2:
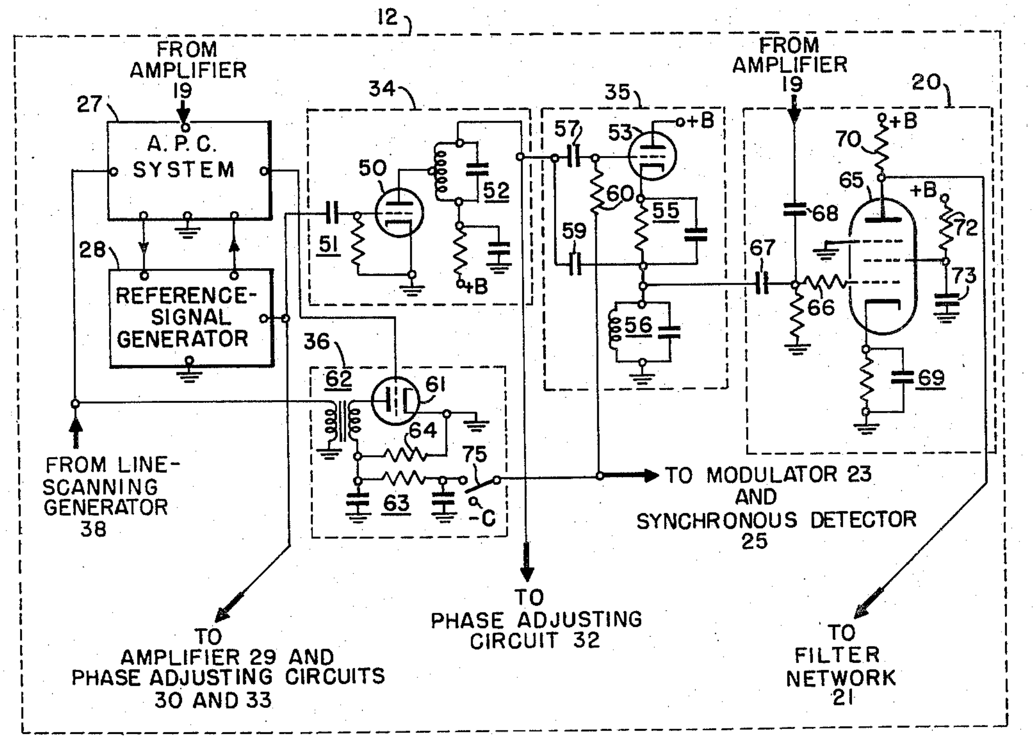
Fig. 2 is a detailed circuit diagram of the video-frequency signal-translating apparatus of Fig. 1.

*Description of video-frequency signal-translating apparatus of Figs. 1 and 2*

In describing the video-frequency signal-translating apparatus of Fig. 1, reference will be made to unit 12 of Fig. 1 to describe generally the combination of specific units in accordance with the present invention and to Fig. 2 to describe details of at least some of these units.

The video-frequency signal-translating apparatus 12 of Fig. 1 is part of a compatible image-reproducing system previously described herein for reproducing in response to applied monochrome or color signals a monochrome or color image, respectively, from a plurality of primary colors at least one of which is periodically developed at a rate within the frequency range of the monochrome signal. As previously considered herein, the image-reproducing system including the device 14 will reproduce color images when a color signal is received, monochrome images when a monochrome signal is being received, or a monochrome image at the option of the viewer when a color signal is being received. Also as previously described herein, such images are reproduced by excitation of a series of groups of phosphor strips on the image screen 14*a* of the device 14, each group comprising strips in the sequence green, red, green, blue. Consequently, the plurality of primary colors are the colors green, red, and blue and both the red and blue colors are developed at a rate within the frequency range of the monochrome signal, that is, at the color-switching rate of approximately 3.6 megacycles which is also the mean frequency of the modulated subcarrier wave signal.

The video-frequency signal-translating apparatus includes a circuit for supplying the high-frequency components of the monochrome or color signals, specifically an output circuit of the amplifier 19 for supplying signals having frequencies in the range of approximately 3.0–4.2 megacycles. Thus, the supplied signal includes either high-frequency monochrome components in the range just mentioned or a subcarrier wave signal having a mean frequency of approximately 3.6 megacycles modulated over the range of 3.0–4.2 megacycles.

The video-frequency signal-translating apparatus also includes signal-generating means for developing a reference signal related in frequency to the period of development of the aforementioned one color, that is, to the sampling rate or frequency of elements of a given color. By stating that the reference signal is harmonically related in frequency to the sampling rate or frequency of elements of a given color, it is meant that the frequencies are related by an integral multiple (which may be unity) and either frequency may be the larger. More specifically, such generating means comprises the reference-signal generator 28 for developing a signal which is substantially equal to the mean frequency of the modulated subcarrier wave signal, that is, a signal of approximately 3.6 megacycles and may include the second harmonic amplifier 34 coupled to the output circuit of the generator 28. The frequency of the signal developed in the generator 28 is equal to, and the signal in the output circuit of the amplifier 34 twice, the period of development of either the red or blue colors in the image-reproducing device 14. These frequency relations are maintained by utilizing the signal developed in the generator 28, after translation through the push-pull amplifier 29, on the color-switching grid 14*b* to effect the previously described color switching to cause the cathode-ray beam to trace a sine-wave path centered on a green phosphor strip as it traces each horizontal line so that it impinges on the green, red, and blue phosphor strips, the sine-wave nature of the path causing the beam to impinge on the green strips at twice the rate it impinges on the red and blue strips.

Referring to Fig. 2, the second harmonic amplifier 34 comprises a triode amplifier tube 50 having a cathode-grid input circuit 51 coupled to the output circuit of reference-signal generator 28 and with the cathode grounded. The anode of the triode 50 includes a parallel-resonant circuit 52 coupled between a source of potential +B and the input circuit of the phase-adjusting circuit 35. The parallel tuned circuit 52 is resonant at the second harmonic frequency of the reference signal, that is, at substantially 7.2 megacycles.

The video-frequency signal-translating apparatus 12 also includes phase-modifying means having a pair of selective phase-modifying conditions for causing the reference signal to have different phases with respect to the period of development of the aforementioned one color in different ones of the phase-modifying conditions. More specifically, such phase-modifying means comprises the phase-adjusting circuit 35 coupled between the output circuit of the amplifier 34 and an input circuit of the R–B axis selector 20.

Referring to Fig. 2, the phase-adjusting circuit 35 includes a triode amplifier 53 having the anode thereof coupled to a source of potential +B and the cathode coupled through a series-connected circuit of a biasing network 55 and a parallel tuned circuit 56 to the other terminal of the potential +B supply, that is, to ground. The tuned circuit 56 is resonant at approximately 7.2 megacycles. The control electrode of the triode 53 is coupled through a condenser 57, and the ungrounded terminal of the tuned circuit 56 is coupled through a condenser 59, to the resonant circuit 52 in the second harmonic amplifier 34. The control electrode of the tube 53 is also coupled through an isolating resistor 60 to the output circuit of the color-killer circuit 36 to be described in detail hereinafter.

The video-frequency signal-translating apparatus 12 also includes a control circuit coupled to the phase-modifying means for selecting different phase-modifying conditions thereof when color and monochrome images are being reproduced. More specifically, such control circuit comprises the automatic-phase-control system 27 and the color-killer circuit 36. The automatic-phase-control system 27 is of a type described in an article entitled "The DC Quadricorrelator: A Two-Mode Synchronization System" published in the January 1954 issue of the Proceedings of the I. R. E. at pages 288–299, inclusive. The details of such an automatic-phase-control system are particularly considered at page 293 of this article with reference to Fig. 5 thereof. As described in such article, the system 27 includes the conventional quadrature-phase detector, for controlling the phase of the signal developed in the generator 28 so that the reference signal has a specific phase relation with respect to the modulated subcarrier wave signal, and also includes an in-phase detector. The in-phase detector is utilized to improve the automatic phase control of the system 27 and additionally develops a unidirectional potential which has a maximum magnitude when the signal developed in the generator 28 is in proper phase relation with respect to the modulated subcarrier wave signal. In the circuit described in such article, such potential is negative when the generator 28 is properly synchronized. The color-killer circuit 36 includes a triode amplifier 61 having the cathode thereof grounded and the control electrode thereof coupled to the output circuit of the in-phase detector in the system 27. The anode of the tube 61 is coupled through a secondary winding of a transformer 62, a low-pass filter circuit 63, and a manually operable switch 75 to the output circuit of the color-killer circuit 36. The primary winding of the transformer 62 is coupled to the line-scanning generator 38, more specifically, to a tap on the horizontal deflection transformer in such generator at which a positive-going horizontal flyback pulse is developed. A load resistor 64 is coupled between the cathode and the anode circuits of the tube 61.

The video-frequency signal-translating apparatus 12 also includes a signal-translating device responsive to the aforementioned reference signal to have varying degrees of conductivity during each cycle of such reference signal. The signal-translating device is coupled to the supply circuit for effecting translation of segments of the supplied high-frequency components at the time of development of the one color, when a color image is being is being reproduced, and at times other than that of the development of the one color when a monochrome image is being reproduced. More specifically, such signal-translating device comprises the R–B axis selector 20 including a pentode amplifier 65 having the control-grid circuit thereof coupled through an isolating resistor 66 and a condenser 67, in series, to the cathode output circuit of the phase-adjusting circuit 35. The circuit just described is effective to apply the reference signal modified in frequency and phase by the units 34 and 35 to the control-electrode circuit of the tube 65 to vary the conductivity of the tube 65 cyclically at a 7.2 megacycle rate. The control electrode of the tube 65 is also coupled through the isolating resistor 66 and a coupling condenser 68 to the output circuit of the amplifier 19. The cathode circuit of the tube 65 is coupled through a biasing network 69 to ground while the anode of such tube is coupled through a load resistor 70 to a source of potential +B. The suppressor electrode of the tube 65 is grounded while the screen electrode thereof is coupled through a load resistor 72 to the source of potential +B and through a by-pass condenser 73 to ground. The anode output circuit of the tube 65 is coupled to the input circuit of the filter network 21.

*Explanation of operation of video-frequency signal-translating apparatus of Figs. 1 and 2*

Preliminary to considering the details of operation of the apparatus 12 of Fig. 1, it will be helpful once again to explain the purpose for such improved video-frequency signal-translating apparatus. As previously stated herein, the color-switching operation in the image-reproducing device 14 is effective to cause the cathode-ray beam developed in such device to impinge upon the different phosphors in a cyclic manner, specifically, in the sequence green, red, green, blue for each group of phosphors. This operation occurs whether a color or monochrome image is being reproduced. When reproducing a color image, due to the previously described controlled phasing of the color-switching and subcarrier wave signals, as represented by the curves of Fig. 1*b*, such cyclic operation is effective to cause the proper colors to be reproduced at the proper times. In addition, the interlaced relationship of the color information with line frequency results in low visibility of any spurious patterns. However, when a monochrome image is being reproduced and the colors should be excited in such relative proportions as to reproduce shades of gray, there is no such interlacing due to the lack of synchronization between line frequency and the color-switching frequency and, consequently, the high-frequency monochrome information in the range of 3.0–4.2 megacycles tends to heterodyne with the 3.6 megacycle rate at which the colors red and blue are excited to cause spurious red and blue patterns to be developed. These spurious patterns represent beat signals in the range of 0–.6 megacycle being developed by the heterodyning of the 3.6 megacycle switching operation with the monochrome signals in the 3.0–4.2 megacycle range. Previously, in order to prevent such spurious patterns, monochrome information applied to the image-reproducing device 14 was limited to an upper frequency of 3 megacycles. This solution was wasteful of information and the improved video-frequency signal-translating apparatus 12 is utilized to modify the high-frequency monochrome information in the range of 3.0–4.2 megacycles so that it may be usefully applied to the image-reproducing device 14. To effect this result, such information is applied only when the beam is impinging upon the phosphor for reproducing green. Since the color-switching frequency for reproducing green is twice that for reproducing red or blue, no visible spurious pattern occurs and high-definition monochrome information is reproduced.

Figure 1A:
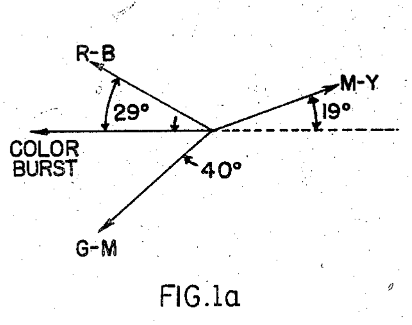
Figure 1B:
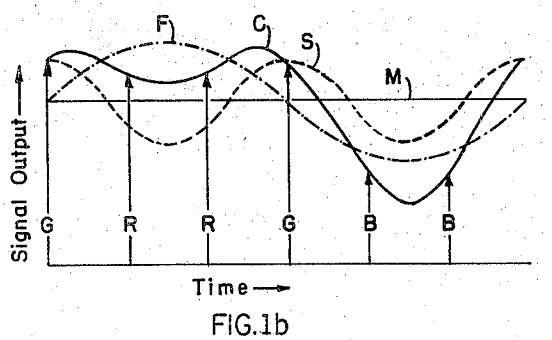

To effect the above result, the R–B axis selector 20 which, when color is being reproduced, conventionally translates color components of the subcarrier wave signal which occur along the R–B phase axis, as represented in Fig. 1*a*, is controlled to translate information only when the electron beam is impinging on the green phosphors, when a monochrome image is being reproduced. Since, under the latter condition, only the phosphor for reproducing green is excited by the translated, high-frequency, monochrome information, the desired result is obtained. No high-frequency monochrome information intensity modulates the cathode-ray beam as it impinges on the red and blue phosphors and, therefore, no spurious red and blue patterns appear.

The operating conditions of an axis selector may be changed, so that it will operate in the manner just described, by changing the phase of the reference signal applied thereto. An axis selector is essentially an amplifier having gain which varies cyclically with the phase of the information signal applied thereto, having maximum gain at specific phases or times of occurrence of the applied information, and minimum or no gain at phases in quadrature with the specific phases or times. By such variation in gain, the information at the specific phases or times of occurrence of the applied information signal is selected or translated through the axis selector while information at other times, corresponding to phases in quadrature with the specific phases of the information signal not selected, is not translated through the axis selector 20, and is, therefore, rejected by the axis selector. Control of the gain of the selector 20 is effected by employing a 7.2 megacycle signal properly adjusted in phase with respect to the color-switching signal to effect translation of the R–B modulation information of the subcarrier wave signal in coincidence with the impinging of the cathode-ray beam on the red and blue phosphors, when a color image is being reproduced, and to effect translation of high-frequency monochrome information in coincidence with the impinging of the beam on the green phosphors, when a monochrome image is being reproduced.

Referring now to Fig. 2, the modulated sub-carrier wave signal is applied to the control electrode of the axis selector 20 through the condenser 68 and the isolating resistor 66. The signal developed in the generator 28, controlled by the A. P. C. system 27 to have a specific phase with relation to the subcarrier wave signal, is heterodyned to a second harmonic signal in the amplifier 34, adjusted in phase by the type of coupling between the circuits 52 and 56, and applied through the condenser 67 and the resistor 66 to the same control electrode of the amplifier 65. If the phase of the phase-adjusted reference signal is such as to have a positive peak in phase with the R–B phase axis of the applied sub-carrier wave signal, in other words, to have positive peaks in coincidence with the exciting of the red and blue phosphors by the cathode-ray beam of the picture tube, then information along the R–B phase axis is translated through the tube 65, the filter network 21, the adder circuit 13, and applied to the cathode of the picture tube to excite the red and blue phosphors. Information along quadrature-phase axes, specifically along the axis in quadrature with the R–B axis, is rejected by not being translated through the amplifier 65. If on the other hand, the phase of the reference signal applied to the control electrode of the tube 65 is such as to have the positive peak thereof in coincidence with the exciting of the green phosphors by the cathode-ray beam, then all information occurring at such time is translated through the tube 65 while all other information is rejected.

To effect the changes in the operating conditions of the axis selector 20 for monochrome and color reproduction, the triode 53 is maintained conductive in one condition and nonconductive in the other condition by a biasing signal developed in the output circuit of the color-killer circuit 36. Such bias signal is zero potential when a color image is being reproduced, thereby causing the tube 53 to be conductive and to provide a low-impedance coupling between the tuned circuits 52 and 56 to provide substantially no phase shift for the 7.2 megacycle signal applied to the selector 20. The phase of the translated signal under such conditions is such as to cause axis selection along the R–B axis in the manner previously discussed. When a monochrome image is being reproduced and a negative bias potential is applied to the grid circuit of the tube 53, the tube 53 becomes nonconductive. Consequently, the signal developed in the output circuit of the amplifier 34 is coupled from the tuned circuit 52 through the condenser 59 to the resonant circuit 56 with a phase shift of substantially 90°. Such phase-shifted signal causes the axis selector 20 to translate information solely at times in coincidence with the excitation of the green phosphor by the cathode-ray beam in the image-reproducing device 14.

To summarize the above explanation, the axis selector 20 is effective to translate information with respect to the red and blue colors when a color image is being reproduced and to translate information only in coincidence with the excitation of the green phosphors when a monochrome image is being reproduced. The phase-adjusting circuit 35 modifies the phase of the second harmonic signal developed by the amplifier 34 so that it causes the axis selector to operate in the manner just described. The color-killer circuit 36 develops the biasing potential for the phase-adjusting circuit 35 to control the phase-modifying conditions of such circuit.

The color-killer circuit 36 is described at page 293 of the January, 1954 I. R. E. and is simply an amplifier responsive to a positive-going flyback pulse from the horizontal deflection transformer and the signal developed in the in-phase detector of the A. P. C. system 27. When the generator 28 is in synchronism with a color burst signal being received, a negative potential is applied by the A. P. C. system 27 to the grid of the triode 61 in the color-killer circuit 36. Under such conditions, the color killer does not develop an output potential and zero bias potential is applied to the triode 53 in the unit 35. When the generator 28 is not synchronized, no negative potential is developed in the system 27 to be applied to the grid of the triode 61. Consequently, the triode 61 conducts on the positive-going flyback pulses and causes a negative potential to be developed in the output circuit thereof. This negative potential is applied to the triode 53 and causes it to become nonconductive. The switch 75 in the circuit coupling the anode of the tube 61 to the control electrode of the tube 53 permits the operator of the television receiver to effect monochrome reproduction even when color information is being received by applying the —C potential to the tube 53 to cause it to become nonconductive.

In considering the above, it should be understood that the improved video-frequency signal-translating apparatus is such as to cause high-frequency information in the range of 3.0–4.2 megacycles to be translated through a circuit and applied to the red and blue phosphors when a color image is being reproduced and corresponding information to be translated through the same circuit and applied only to the green phosphors when a monochrome image is being reproduced. The phosphors to which the translated information is applied are determined by the relative phasing of the color-switching signal controlling the beam position on the phosphors and the 7.2 megacycle reference signal applied to the axis selector. Consequently, the phase-modifying means described above may be employed either to modify the phase of the reference signal with respect to that of the color-switching signal, in the manner just described, or, as will be described hereinafter with reference to Fig. 4, the phase of the color-switching signal may be modified with respect to that of the reference signal to accomplish the same purpose. Additionally, it should be recognized that the circuit for controlling the phase modification may automatically effect such modification not only when the applied signals differ, that is, are either color signals or monochrome signals, but also, at the option of the viewer, may effect such modification by means of the manual switch 75 so that a monochrome reproduction is obtainable even when the applied signals are color signals.

Figure 3:
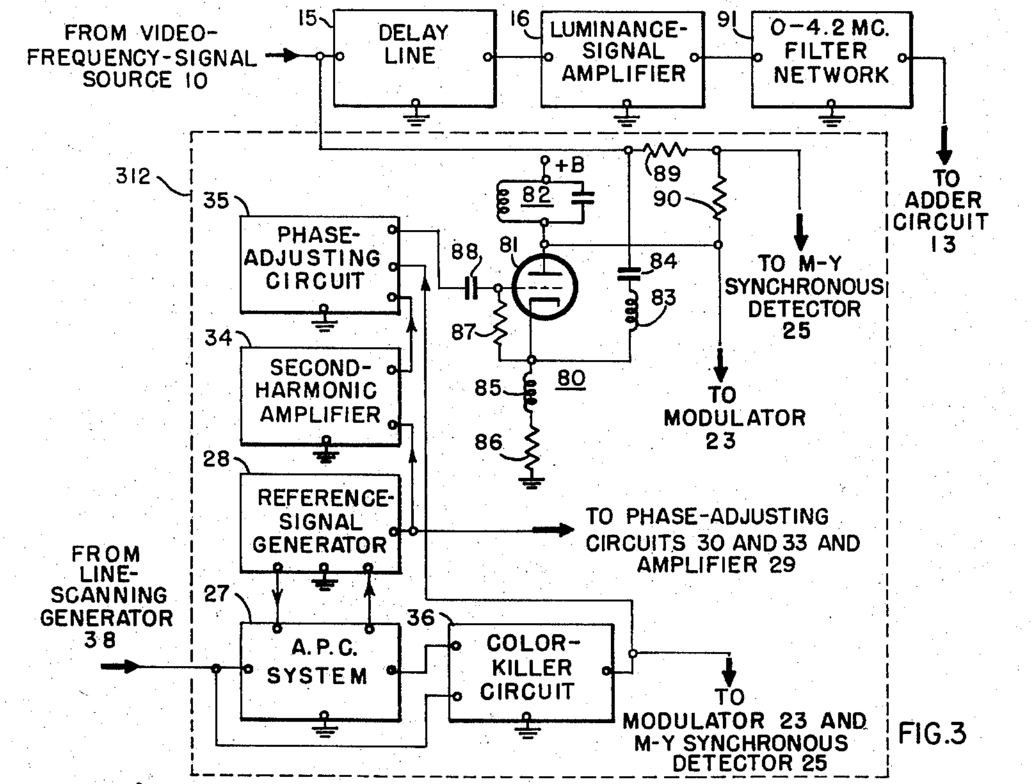
Fig. 3 is a schematic diagram of a modified form of the video-frequency signal-translating apparatus of Fig. 1.

*Description and explanation of operation of video-frequency signal-translating apparatus of Fig. 3*

In the apparatus 12 of Fig. 1, the modified subcarrier wave signal modulated by the R–B component is translated through a channel parallel to the luminance channel. It is sometimes beneficial to translate both the luminance information and the subcarrier wave signal, modified to include R–B information, through the same channel. In addition, in the apparatus 12 of Fig. 1, separate phase-adjusting circuits and axis selectors are employed to obtain the R–B and G–M information. In the apparatus 312 of Fig. 3, a single axis selector of a composite type is utilized to effect selection of both the R–B and G–M information and a subcarrier wave signal, modified to include the R–B information or modified high-frequency components as previously discussed herein, is translated through the luminance channel with the luminance signal.

Since many of the units in the apparatus 312 of Fig. 3 are similar to units in Fig. 1, such similar units are identified by the same reference numerals in both Figs. 1 and 3.

The apparatus 312 of Fig. 3 includes a composite axis selector 80. The axis selector 80 effects translation of G–M information through one path and R–B information through a different path when a color image is being reproduced and, when a monochrome image is being reproduced, effects translation of high-frequency information through the luminance channel only when the phosphors for developing green are being excited. The composite axis selector 80 includes a triode amplifier 81 having the anode thereof coupled through a parallel tuned circuit 82 to a source of potential +B and also coupled to a modulator such as the modulator 23 of Fig. 1. The cathode of the tube 81 is coupled through a series-resonant circuit comprising an inductor 83 and a condenser 84 to the channel for translating the luminance signal, specifically, to an output circuit of the video-frequency signal source 10 or to the input circuit of the delay line 15. The cathode is also coupled through an inductor 85 and a resistor 86 to the negative terminal of the B-potential source, specifically, to ground. Both the parallel-resonant circuit 82 and the series-resonant circuit including the elements 83 and 84 are tuned approximately to the mean frequency of the modulated subcarrier wave signal, specifically, to approximately 3.6 megacycles. The cathode of the tube 81 is also coupled through a biasing resistor 87 to the control electrode of this tube and the control electrode is coupled through a coupling condenser 88 to the output circuit of the phase-adjusting circuit 35. A pair of matrixing resistors 89 and 90 is connected in series between the anode of the tube 81 and the input circuit of the delay line 15, the junction of these resistors being connected to the M–Y synchronous detector 25 in the receiver of Fig. 1. These resistors are proportioned to matrix the G–M and R–B components to provide an M–Y component. The vector diagram of Fig. 1*a* indicates the relationship of these components and the possibility of matrixing G–M and R–B to provide M–Y.

Except for the operation of the axis selector 80 and the translation of the subcarrier wave signal including the R–B information through the same channel as the luminance signal, the video-frequency signal translating apparatus 312 of Fig. 3 operates in the same manner as the apparatus 12 of Figs. 1 and 2. The axis selector 80 is designed to make use of the fact that the R–B and G–M axes are substantially in quadrature as represented by the vectors of Fig. 1*a*. If such axes are 90° out of phase at the mean frequency of the sub-carrier wave signal, that is, at 3.6 megacycles, they are substantially 180° out of phase with respect to the 7.2 megacycle reference signal applied to the control electrode of the triode 81 from the output circuit of the phase-adjusting circuit 35. By properly phasing the 7.2 megacycle signal applied to the control electrode of the triode 81, such triode can perform the function of the two axis selectors of Fig. 1 or 2 by translating the G–M components out of the circuit for translating the R–B components and leave only the R–B components in the latter circuit. More specifically, when a color image is being reproduced, the 7.2 megacycle signal applied to the control electrode of the triode 81 is adjusted in-phase to render the triode conductive at the time when the G–M axis of the modulated subcarrier wave signal is applied to the cathode of the triode through the series-resonant circuit 83, 84. Since the triode is then conductive, it translates the information on the G–M axis to the anode of the triode and applies such to the modulator 23. At the time the R–B axis of the sub-carrier wave signal is applied to the cathode of the triode 81, the 7.2 megacycle signal is negative and the tube is not conductive. Therefore, the R–B information is retained in the channel for translating the luminance signal and, consequently, both the low-frequency luminance information, specifically, the 0–3 megacycle information and a subcarrier wave signal having an upper side band extending to approximately 4.2 megacycles and modulated solely by R–B information are translated through the luminance channel.

When a monochrome image is being reproduced and only that information in the frequency range of 3.0–4.2 megacycles, which coincides in time with the time the electron beam is exciting the green phosphors, should be translated through the luminance channel, then the phase-modifying condition of the circuit 35 is changed in the manner previously described herein to cause the action of the triode 81 to effect such result. Specifically, when a monochrome image is being reproduced, the triode 81 becomes conductive at the times the electron beam in the picture tube is impinging on the red and blue phosphors, thereby shunting any high-frequency information occurring at such times out of the luminance channel, and, consequently, no high-frequency information is applied to such phosphors. The triode 81 is rendered nonconductive during the times the beam in the cathode-ray tube is impinging on the green phosphors and, therefore, all of the high-frequency monochrome information occurring at the latter times remains in the luminance channel and is applied to the green phosphors.

Figure 4:
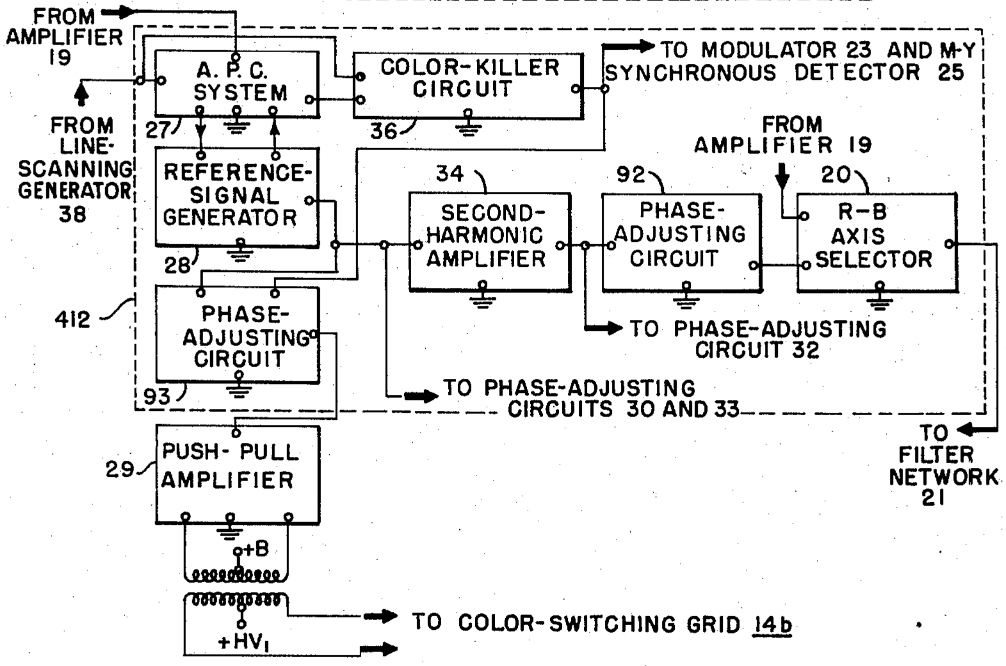
Fig. 4 is a schematic diagram of another modified form of the video-frequency signal-translating apparatus of Fig. 1.

*Description and explanation of operation of Fig. 4*

As stated previously, in accordance with the present invention, the phase of the reference signal applied to the R–B axis selector may be modified to effect the results described above when reproducing color and monochrome images or the reference signal may remain unmodified and, therefore, the operation of the R–B axis selector remains unmodified while the phase of the color-switching signal is modified with respect to the reference signal. The same results are obtained by either modifying the phase of the reference signal with respect to the color-switching signal or by modifying the phase of the color-switching signal with respect to the reference signal. The video-frequency signal-translating apparatus of Fig. 4 represents apparatus in which the latter phase modification is effected.

Since in the apparatus 412 of Fig. 4 many of the units are similar to units in Fig. 1, the same reference numerals are used for such units in both Figs. 1 and 4. In Fig. 4, a phase-adjusting circuit 92 having constant phase-modifying characteristics is coupled between the output circuit of the second harmonic amplifier 34 and an input circuit of the R–B axis selector 20. A phase-adjusting circuit 93 having different phase-adjusting characteristics when monochrome and color images are being reproduced is coupled between the output circuit of the reference-signal generator 28 and the input circuit of the push-pull amplifier 29. The phase-modifying conditions of the circuit 93 are controlled by the signal developed in the color-killer circuit 36 in the manner previously described herein with reference to the phase-adjusting circuit 35 of Fig. 1.

The operation of the apparatus 412 of Fig. 4 differs from the apparatus 12 of Fig. 1 solely in that the phase of the color-switching signal is modified instead of modifying the phase of the reference signal applied to the axis selector 20. The same results are obtained in either case. The phase-adjusting circuit 93 is controlled to cause the color-switching signal to have one phase with respect to the subcarrier wave signal translated through the axis selector 20 when a color image is being reproduced, specifically to have such phase that the subcarrier wave signal translated through the axis selector 20 applies red and blue information to the proper phosphors. When a monochrome image is being reproduced, the phase of the color-switching signal is modified, in the manner previously described herein, to cause the signal translated through the axis selector 20 to apply information solely to the phosphors for reproducing green. In this way, the spurious red and blue patterns in reproduced monochrome images are minimized.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In a compatible image-reproducing system including means for reproducing a monochrome or color image by periodic sampling of different primary color elements and susceptible to spurious color distortions during the reproduction of a monochrome image due to sampling of high-frequency video components upon their application to elements of a given primary color, video-frequency signal-translating apparatus comprising: a circuit for supplying at least the high-frequency components of said monochrome or color signals; signal-generating means for developing a reference signal harmonically related in frequency to the sampling rate of elements of said given color and having different phases with respect to the sampling times of said given color when color and monochrome images are being reproduced; and signal-translating means coupled to said signal-generating means and having a varying signal-translation factor controlled by said reference signal and coupled to said supply circuit for effecting translation of said supplied high-frequency components primarily at said sampling times of said given color when a color image is being reproduced and primarily at other times when a monochrome image is being reproduced.

2. In a compatible image-reproducing system including means for reproducing a monochrome or color image by periodic sampling of different primary color elements and susceptible to spurious color distortions during the reproduction of a monochrome image due to sampling of high-frequency video components upon their application to elements of a given primary color, video-frequency signal-translating apparatus comprising: a circuit for supplying the high-frequency components of said monochrome or color signals; signal-generating means for developing a reference signal having twice the frequency of the sampling rate of elements of said given color and having different phases with respect to the sampling times of said given color when color and monochrome images are being reproduced; and signal-translating means coupled to said signal-generating means and having a varying signal-translation factor controlled by said reference signal and coupled to said supply circuit for effecting translation of said supplied high-frequency components primarily at said sampling times of said given color when a color image is being reproduced and primarily at other times when a monochrome image is being reproduced.

3. In a compatible image-reproducing system including means for reproducing a monochrome or color image by periodic sampling of green, red, and blue color elements and susceptible to spurious color distortions during the reproduction of a monochrome image due to sampling of high-frequency video components upon their application to elements of said red and blue colors, video-frequency signal-translating apparatus comprising: a circuit for supplying the high-frequency components of said monochrome or color signals; signal-generating means for developing a reference signal harmonically related in frequency to the individual sampling rates of elements of said red and blue colors and having different phases with respect to the sampling times of said red and blue colors when color and monochrome images are being reproduced; and signal-translating means coupled to said signal-generating means and having a varying signal-translation factor controlled by said reference signal to have varying degrees of conductivity during each cycle thereof and coupled to said supply circuit for effecting translation of said supplied high-frequency components of said red and blue colors when a color image is being reproduced and primarily at sampling the time of said green color when a monochrome image is being reproduced.

4. Video-frequency signal-translating apparatus for a compatible image-reproducing system for reproducing, in response to applied monochrome or color signals, a monochrome or color image, respectively, from a plurality of primary colors developed in sequence at least one of which is periodically developed at a rate within the frequency range of the monochrome signal and another of which is periodically developed at twice said rate, comprising: a circuit for supplying the high-frequency components of said monochrome or color signals; signal-generating means for developing a reference signal equal in frequency to said period of development of said other color; for causing said reference signal to have different phases with respect to said period when color and monochrome images are being reproduced; and signal-translating means responsive to said reference signal to have two periods of conductivity during each of said sequences and coupled to said supply circuit for effecting translation of segments of said supplied high-frequency components primarily at the time of development of said one color when a color image is being reproduced and primarily at the time of development of said other color when a monochrome image is being reproduced.

5. Video-frequency signal-translating apparatus for a compatible image-reproducing system for reproducing, in response to applied monochrome or color signals, a monochrome or color image, respective, from a plurality of primary colors at least one of which is periodically developed at approximately a 3.6 megacycle rate, comprising: a circuit for supplying substantially the 3.0–4.2 megacycle components of said monochrome or color signals; signal-generating means for developing a reference signal of approximately 7.2 megacycles; means for causing said reference signal to have different phases with respect to said period when color and monochrome images are being reproduced; and signal-translating means responsive to said reference signal to have periods of maximum conductivity at a 7.2 megacycle rate and coupled to said supply circuit for effecting translation of segments of said 3.0–4.2 megacycle components primarily at the time of development of said one color when a color image is being reproduced and primarily at times other than that of the development of said one color when a monochrome image is being reproduced.

6. Video-frequency signal-translating apparatus for a compatible image-reproducing system for reproducing, in response to applied monochrome or color signals, a monochrome or color image, respectively, from a plurality of primary colors at least one of which is periodically developed at a rate approximating the frequency range of the monochrome signal, comprising: a circuit for supplying the high-frequency components of said monochrome or color signals; signal-generating means for developing a reference signal harmonically related in frequency to said period of development of said one color; means for translating said reference signal with different phases with respect to said period when color and monochrome images are being reproduced; and signal-translating means coupled to said phase-modifying means and responsive to said translated reference signal to have varying degrees of conductivity during each cycle thereof and coupled to said supply circuit for effecting translation of segments of said supplied high-frequency components primarily at the time of development of said one color when a color image is being reproduced and primarily at times other than that of the development of said one color when a monochrome image is being reproduced.

7. Video-frequency signal-translating apparatus for a compatible image-reproducing system for reproducing, in response to applied monochrome or color signals, a monochrome or color image, respectively, from a plurality of primary colors at least one of which is periodically developed at a rate approximating the frequency range of the monochrome signal, comprising: a circuit for supplying the high-frequency components of said monochrome or color signals; signal-generating means for developing a reference signal for controlling said period of development of said one color and harmonically related in frequency thereto; means coupled to said signal-generating means for translating said reference signal with different phase delays for causing the time of development of said one color to change with respect to a reference phase of said generated reference signal when color and monochrome images are being reproduced; and signal-translating means coupled to said generating means and responsive to said reference signal developed therein to have varying degrees of conductivity during each cycle thereof and coupled to said supply circuit for effecting translation of segments of said supplied high-frequency components primarily at the time of development of said one color when a color image is being reproduced and primarily at times other than that of the development of said one color when a monochrome image is being reproduced.

8. Video-frequency signal-translating apparatus for a compatible image-reproducing system for reproducing, in response to applied monochrome or color signals, a monochrome or color image, respectively, from a plurality of primary colors at least one of which is periodically developed at a rate approximately the frequency range of the monochrome signal, comprising: a circuit for supplying the high-frequency components of said monochrome or color signals; signal-generating means for developing a reference signal harmonically related in frequency to said period of development of said one color; an electron-discharge device having a pair of coupled resonant circuits tuned to the frequency of said reference signal for translating said reference signal with different phase delays when said device is conductive and nonconductive; a control circuit coupled to said electron-discharge device for causing said device to have different states of conductivity when color and monochrome images are being reproduced; and signal-translating means responsive to said reference signal to have varying degrees of conductivity during each cycle thereof and coupled to said supply circuit for effecting translation of segments of said supplied high-frequency components primarily at the time of development of said one color when a color image is being reproduced and primarily at times other than that of the development of said one color when a monochrome image is being reproduced.

9. Video-frequency signal-translating apparatus for a compatible image-reproducing system for reproducing, in response to applied monochrome or color signals, a monochrome or color image, respectively, from a plurality of primary colors at least one of which is periodically developed at a rate approximately the frequency range of the monochrome signal, comprising: a circuit for supplying the high-frequency components of said monochrome or color signals; signal-generating means for developing a reference signal harmonically related in frequency to said period of development of said one color; phase-modifying means for causing said reference signal to have different phases with respect to said period; a signal-identification circuit coupled to said supply circuit and said phase-modifying means for identifying said supplied components as monochrome or color and for altering the operation of said phase-modifying means when color and monochrome images are being reproduced; and signal-translating means responsive to said reference signal to have varying degrees of conductivity during each cycle thereof and coupled to said supply circuit for effecting translation of segments of said supplied high-frequency components primarily at the time of development of said one color when a color image is being reproduced and primarily at times other than that of the development of said one color when a monochrome image is being reproduced.

10. Video-frequency signal-translating apparatus for a compatible image-reproducing system for reproducing, in response to applied monochrome or color signals, a monochrome or color image, respectively, from a plurality of primary colors at least one of which is periodically developed at a rate approximating the frequency range of the monochrome signal, comprising: a circuit for supplying the high-frequency components of said monochrome or color signals; signal-generating means for developing a reference signal harmonically related in frequency to said period of development of said one color; an electron-discharge device having a pair of coupled resonant circuits tuned to the frequency of said reference signal for translating said reference signal with one phase delay when said device is in one conduction condition and with another phase delay when said device is in another conduction condition; a control circuit responsive to said supplied components for developing an identification signal identifying said components as monochrome or color and coupled to said device for utilizing said identification signal to cause said device to have said one conduction condition when color images are being reproduced and said other conduction condition when monochrome images are being reproduced; and signal-translating means responsive to said phase-delayed reference signal to have varying degrees of conductivity during each cycle thereof and coupled to said supply circuit for effecting translation of segments of said supplied high-frequency components primarily at the time of development of said one color when a color image is being reproduced and primarily at times other than that of the development of said one color when a monochrome image is being reproduced.

11. Video-frequency signal-translating apparatus for a compatible image-reproducing system for reproducing, in response to applied monochrome or color signals, a monochrome or color image, respectively, from a plurality of primary colors at least one of which is periodically developed at a rate approximating the frequency range of the monochrome signal, comprising: a circuit for supplying the high-frequency components of said monochrome or color signals; signal-generating means for developing a reference signal harmonically related in frequency to said period of development of said one color; means for causing said reference signal to have different phases with respect to said period when color and monochrome images are being reproduced; and a periodically conductive device having the conductivity thereof periodically controlled by said reference signal and coupled to said supply circuit for effecting translation of segments of said supplied high-frequency components primarily at the time of development of said one color when a color image is being reproduced and primarily at times other than that of the development of said one color when a monochrome image is being reproduced.

12. Video-frequency signal-translating apparatus for a compatible image-reproducing system for reproducing, in response to applied monochrome or color signals, a monochrome or color image, respectively, from a plurality of primary colors at least one of which is periodically developed at a rate approximately the frequency range of the monochrome signal, comprising: a signal-translating channel for translating said monochrome or color signals; signal-generating means for developing a reference signal harmonically related in frequency to said period of development of said one color; means for causing said reference signal to have different phases with respect to said period when color and monochrome images are being reproduced; and signal-translating means responsive to said reference signal to have varying degrees of conductivity during each cycle thereof and having an input circuit coupled to said signal-translating channel and having one output circuit for effecting translation of segments of the high-frequency components of said monochrome or color signals primarily at the time of development of said one color when a color image is being reproduced and primarily at times other than that of the development of said one color when a monochrome image is being reproduced and having an output circuit for translating the segments of said high-frequency components of said monochrome or color signals untranslated by said one output circuit when said color image is being reproduced.

13. Video-frequency signal-translating apparatus for a compatible image-reproducing system for reproducing, in response to applied monochrome or color signals, a monochrome or color image, respectively, from a plurality of primary colors at least one of which is periodically developed at approximately a 3.6 megacycle rate, comprising: a circuit for supplying substantially the 3.0–4.2 megacycle components of said monochrome or color signals; signal-generating means for developing a reference signal having a frequency of approximately 7.2 megacycles; for causing said reference signal to have different phases with respect to said period when color and monochrome images are being reproduced; and a periodically conductive amplifier responsive to said reference signal and rendered conductive thereby at approximately a 7.2 megacycle rate and coupled to said supply circuit for effecting translation of segments of said 3.0–4.2 megacycle components primarily at the time of development of said one color when a color image is being reproduced and primarily at times other than that of the development of said one color when a monochrome image is being reproduced.

14. Video-frequency signal-translating apparatus for a compatible image-reproducing system for reproducing, in response to applied monochrome or color signals, a monochrome or color image, respectively, from green, red, and blue primary colors, the red and blue colors being periodically developed at a 3.6 megacycle rate and the green at a 7.2 megacycle rate, comprising: a circuit for supplying substantially the 3.0–4.2 megacycle components of said monochrome or color signals; signal-generating means for developing a reference signal of approximately 7.2 megacycles having a specific phase with respect to said 3.6 megacycle rate; phase-modifying means for translating said reference signal with different phases with respect to said 3.6 megacycle rate; a signal-identification circuit coupled to said supply circuit and said phase-modifying means for identifying said supplied components as monochrome or color and for altering the operation of said phase-modifying means when color and monochrome images are being reproduced; and a periodically conductive amplifier responsive to said translated reference signal and rendered conductive thereby at a 7.2 megacycle rate and coupled to said supply circuit for effecting translation of segments of said supplied 3.0–4.2 megacycle components primarily at the times of development of said red and blue colors when a color image is being reproduced and primarily at the time of development of said green color when a monochrome image is being reproduced.

15. Video-frequency signal-translating apparatus for a compatible image-reproducing system for reproducing, in response to applied monochrome or color signals, a monochrome or color image, respectively, from a plurality of primary colors at least one of which is periodically developed at a rate approximately the frequency range of the monochrome signal, comprising: a circuit for supplying the high-frequency components of said monochrome or color signals; signal-generating means for developing a reference signal harmonically related in frequency to said period of development of said one color; an electron-discharge device having a pair of coupled resonant circuits tuned to the frequency of said reference signal for translating said reference signal with one phase delay when said device is conductive and with a longer phase delay when said device is non-conductive; a control circuit responsive to said supplied components for developing an identification signal identifying said components as monochrome or color and coupled to said device for utilizing said identification signal to cause said device to be conductive when color images are being reproduced and non-conductive when monochrome images are being reproduced; and a periodically conductive amplifier responsive to said phase-delayed reference signal and cylically rendered conductive thereby and coupled to said supply circuit for effecting translation of segments of said supplied high-frequency components primarily at the time of development of said one color when a color image is being reproduced and primarily at times other than that of the development of said one color when a monochrome image is being reproduced.

16. Video-frequency signal-translating apparatus for a compatible image-reproducing system for reproducing, in response to applied monochrome or color signals, a monochrome or color image, respectively, from green, red, and blue primary colors, the red and blue colors being periodically developed at substantially at 3.6 megacycle rate and the green at substantially a 7.2 megacycle rate, comprising: a circuit for supplying substantially the 3.0–4.2 megacycle components of said monochrome or color signals; signal-generating means for developing a reference signal of approximately 7.2 megacycles having a specific phase with respect to said 3.6 megacycle rate; an electron-discharge device having a pair of coupled resonant circuits tuned approximately to 7.2 megacycles for translating said reference signal with one phase delay when said device is conductive and with a quadrature-phase delay when said device is nonconductive; a signal-identification circuit responsive to said supplied components for developing an identification signal identifying said components as monochrome or color and coupled to said device for utilizing said identification signal to cause said device to be conductive when color images are being reproduced and nonconductive when monochrome images are being reproduced; and a periodically conductive amplifier responsive to said phase-delayed reference signal and rendered conductive thereby at substantially a 7.2 megacycle rate and coupled to said supply circuit for effecting translation of segments of said supplied 3.0–4.2 megacycle components primarily at the times of development of said red and blue colors when a color image is being reproduced and primarily at the time of development of said green color when a monochrome image is being reproduced.

17. Video-frequency signal-translating apparatus for a compatible television system comprising: a color tube in which color or monochrome images may be produced by periodic switching to different primary colors, the tube being subject to undesirable color effects when displaying in monochrome because of heterodyning between the switching signals and high-frequency video signals; means for supplying the video information representative of those high-frequency video signals to said tube in proper phase to be switched by the switching signals to the different primary colors when displaying a color image; and means for supplying to said tube only that part of the video information representative of those high-frequency video signals corresponding to the timing of one of said primary colors when displaying a monochrome image.

References Cited in the file of this patent

UNITED STATES PATENTS

| | | |
|---|---|---|
| 2,744,952 | Lawrence | May 8, 1956 |
| 2,745,899 | Maher | May 15, 1956 |

OTHER REFERENCES

Color TV, Rider Pub., March 1954, pages 141 and 142.

Introduction to Color Television, Admiral Corporation, February 1954, pages 17 to 27.

UNITED STATES PATENT OFFICE
CERTIFICATE OF CORRECTION

Patent No. 2,856,454 October 14, 1958

Bernard D. Loughlin

It is hereby certified that error appears in the printed specification of the above numbered patent requiring correction and that the said Letters Patent should read as corrected below.

Column 16, line 14, after "components" insert -- primarily at said sampling times --; line 15, after "at" insert -- the --; line 16, before "time" strike out "the"; line 30, before "for" insert -- means --; column 16, line 44, for "respective" read -- respectively --; column 17, lines 43 and 70, and column 19, line 3, for "approximately", in each occurrence, read -- approximating --; column 19, line 36, before "for" insert -- means --; column 20, line 6, for "approximately" read -- approximating --; line 37, for "at", second occurrence, read -- a --.

Signed and sealed this 24th day of February 1959.

(SEAL)

Attest:
KARL H. AXLINE

Attesting Officer

ROBERT C. WATSON
Commissioner of Patents